United States Patent [19]
Saito et al.

[11] Patent Number: 5,874,505
[45] Date of Patent: Feb. 23, 1999

[54] POLYPROPYLENE COMPOSITION

[75] Inventors: Jun Saito, Kimitsi; Naoshi Kawamoto, Kanazawa; Akiko Kageyama, Ichikawa; Kouichi Hatada, Ichihara; Yoshiyuki Oogi, Chiba; Tsutomu Ushioda, Ichihara, all of Japan

[73] Assignee: Chisso Corporation, Osaka, Japan

[21] Appl. No.: 980,421

[22] Filed: Nov. 28, 1997

[30] Foreign Application Priority Data

Dec. 2, 1996 [JP] Japan ................................ 8-336424

[51] Int. Cl.$^6$ ........................................ C08L 23/12

[52] U.S. Cl. ........................... 525/240; 525/322; 525/88; 525/323; 525/95; 526/943

[58] Field of Search .................. 525/240, 88, 95, 525/342, 322; 526/943

[56] References Cited

FOREIGN PATENT DOCUMENTS

| | | |
|---|---|---|
| 4-337308 | 11/1992 | Japan . |
| 5-202152 | 8/1993 | Japan . |
| 6-172414 | 6/1994 | Japan . |
| 6-206921 | 7/1994 | Japan . |
| 6-287257 | 10/1994 | Japan . |

*Primary Examiner*—Mark L. Warzel
*Attorney, Agent, or Firm*—McDermott, Will & Emery

[57] ABSTRACT

A polypropylene composition comprising 20 to 95% by weight of a stereoregular polypropylene characterized by the specified physical properties determined from $^{13}C$ NMR spectra and 5 to 80% by weight of an α-olefin copolymer comprising 10 to 90% by weight of an α-olefin and 10 to 90% by weight of at least one of other α-olefins. The polypropylene composition demonstrates good balance of rigidity and impact resistance, high heat resistance and high toughness, when used as molding materials.

13 Claims, No Drawings

POLYPROPYLENE COMPOSITION

FIELD OF THE INVENTION

This invention relates to a polypropylene composition comprising a stereoregular polypropylene having a specific structure and an α-olefin copolymer. More specifically, the invention relates to the polypropylene composition which exhibits very good balance of rigidity and impact resistance, high heat resistance and high toughness, when used as molding materials.

BACKGROUND OF THE INVENTION

A crystalline polypropylene has been extensively used in the field of various moldings, because of good mechanical properties, good chemical resistance or the like, very useful balance with economy. However, the use of a propylene homopolymer as the crystalline polypropylene brings about an increase in rigidity, but lack of impact resistance. Therefore, an improvement in impact resistance has been made by a method of adding an ethylene/propylene rubber, an ethylene/propylene/diene rubber or the like to the propylene homopolymer and a method for the polymerization of propylene alone, followed by the copolymerization of ethylene and propylene to produce a so-called block copolymer. However, more improvement in balance of rigidity and impact resistance has been desired. Further, there is a strong desire for the improvement in performance of polypropylene, in particular its heat resistance and toughness with the aim of expanding the use limited in prior polypropylene.

It is known that an isotactic polypropylene is produced by the polymerization of propylene, using a catalyst consisting of a combination of a metallocene and an aluminoxane which is different from the prior catalyst systems. It is also known that the so-called block copolymer is produced by the polymerizatiuon of propylene alone using a similar catalyst, followed by the copolymerization of ethylene and propylene.

For example, Japanese Patent Kokai Hei 4-337308 discloses an example using as the metallocene dimethylsilyl bis(2,4-dimethylcyclopentadienyl)zirconium dichloride, Japanese Patent Kokai Hei 6-287257 discloses an example using dimethylsilyl bis(methylcyclopentadienyl)hafnium dichloride, Japanese Patent Kokai Hei 5-202152 and Hei 6-206921 disclose an example using rac-ethylene bis(indenyl)hafnium dichloride, rac-dimethylsilyl bis(indenyl)hafnium dichloride and rac-phenylmethylsilyl bis(indenyl)hafnium dichloride and Japanese Patent Kokai Hei 6-172414 discloses an example using dimethylsilylene bis(2-methylindenyl)zirconium dichloride and dimethylsilylene bis(tetrahydroindenyl)zirconium dichloride.

The propylene/ethylene block copolymers produced by use of those metallocenes have achieved to some extent an improvement in impact resistance, but there is room for improvement in rigidity and heat resistance.

Thus, a problem involved in the polypropylene composition produced by known processes is more improvement in the balance of rigidity and impact resistance, heat resistance and toughness.

SUMMARY OF THE INVENTION

The present inventors have made extensive investigation in an effort to solve the above-mentioned problem and have found that the polypropylene composition comprising a stereoregular polypropylene having a specific structure and an α-olefin copolymer has very good balance of rigidity and impact resistance, and exhibits high heat resistance and tenacity, thus leading to the completion of the present invention, when used as molding materials.

As apparent from the foregoing, an object of the present invention is to solve the above-mentioned problems involved in the prior art and to provide the polypropylene composition having very good balance of rigidity and impact resistance and exhibiting high heat resistance and toughness, when used as molding materials.

According to the present invention, there is provided a polypropylene composition comprising 20 to 95% by weight of a stereoregular polypropylene and 5 to 80% by weight of an α-olefin copolymer, wherein the polypropylene is characterized in that (a) an isotactic pentad (m m m m) is 0.940 to 0.995,
(b) a syndiotactic pentad (r r r r) is 0 to 0.01,
(c) a different bond due to 2,1- and 1,3-insertions of propylene monomer is 0 to 0.10 mol %,
(d) a weight average molecular weight (Mw) is 50,000 to 1,000,000 and
(e) a ratio (Mw/Mn) of the weight average molecular weight (Mw) to a number average molecular weight (Mn) is 1.5 to 3.8,
(a) to (e) being determined from $^{13}C$ NMR spectra, and the α-olefin copolymer comprises 10 to 90% by weight of an α-olefin and 10 to 90% by weight of at least one of other α-olefins.

DETAILED DESCRIPTION OF THE INVENTION

The stereoregular polypropylene used in the polypropylene composition of the present invention should meet the requirements (a) to (e) as mentioned above, but a propylene/α-olefin copolymer containing not more than 5% by weight of α-olefin can be used equivalently in place of the stereoregular polypropylene, if it can meet the above requirements (a) to (e). Thus, it should be included within the scope of the present invention to use the propylene/α-olefin copolymer containing not more than 5% by weight of α-olefin for the component in the polypropylene composition of the present invention in place of the stereoregular polypropylene, if said propylene/α-olefin copolymer can meet the above requirements (a) to (e).

The propylene/α-olefin copolymer which is usable in the present invention contains not more than 5% by weight of α-olefin, for which α-olefins of 2–12 carbons are used, preferably ethylene, 1-butene, 4-methyl-1-pentene, most preferably ethylene and 1-butene. The α-olefin can be used alone or in admixture therewith, and polyenes may be used in an amount of less than 1% by weight.

Of the requirements for the stereoregular poly-propylene used in the present invention, the above-identified requirements (a)–(c) are calculated based on the results determined by $^{13}C$ NMR spectra in accordance with the following method. More specifically, the NMR spectra was recorded at 130° C. on a JEOL-GX270 spectrometer manufactured by Nihon Densi K. K. in Japan operating at 67.20 MHz, using a mixed solution of o-dichlorobenzene/benzene bromide with 8/2 weight ratio having 20% by weight of polymer concentration.

The terms "isotactic pentad (m m m m)" and "syndiotactic pentad (r r r r)" as used herein refer to the isotactic sequence and the syndiotactic sequence, respectively, in terms of a pentad unit in the polypropylene molecular chain determined by $^{13}C$ NMR spectra which was suggested by A. Zambelli, et al in Macromolecules Vol. 6, No. 6, 925–926, 1973.

A method of deciding the assignment of peak in the determination of $^{13}C$ NMR spectra is performed in accordance with the assignment suggested by A. Zambelli, et al in Macromolecules Vol. 8, No. 5, 687–688, 1975.

The isotactic pentad (m m m m) (a) of the requirements for the stereoregular polypropylene in the present invention is the proportion of a propylene monomer unit containing 5 successive meso bonds which are present in all propylene monomer units in the polypropylene molecules. Higher isotactic (m m m m) pentad shows higher isotactic characteristics. The stereoregular polypropylene of the present invention has the isotactic (m m m m) pentad of 0.940 to 0.995, preferably 0.950 to 0.995, most preferably 0.960 to 0.995.

The syndiotactic pentad (r r r r) (b) of the requirements for the stereoregular polypropylene in the present invention is the proportion of a propylene monomer unit containing 5 successive racemic bonds which are present in all propylene monomer units in the polypropylene molecules. Lower syndiotactic (r r r r) pentad shows lower syndiotactic characteristics. The stereoregular polypropylene of the present invention has the syndiotactic (r r r r) pentad of 0 to 0.01, preferably 0 to 0.007, most preferably 0 to 0.004.

The term "different bond due to 2,1- and 1,3-insertions of propylene monomer" as used herein refers to the proportion of a different bond due to 2,1- and 1,3-insertions of propylene monomer which is present in the polypropylene molecules determined by $^{13}C$ NMR spectra in accordance with the method suggested by T. Tsutsui et al in POLYMER Vol. 30, 1350–1356, 1989.

The different bond due to 2,1- and 1,3-insertions of propylene monomer (c) of the requirements for the stereoregular polypropylene in the present invention is 0 to 0.10 mol %, preferably 0 to 0.08 mol %. When conventional known titanium catalysts are used in the polymerization of propylene, the polymerization proceeds by the 2,1-insertion. When known metallocene catalysts are used, on the other hand, it is known that a certain degree of 2,1- and 1,3- insertions takes place and a specific amount of different bond is present in the resulting polypropylene.

From the requirements (a) to (c) as listed above, it can be confirmed that the stereoregular polypropylene used in the present invention does not contain substantially chains of different bond and racemic bond, and demonstrates exceedingly high isotactic characteristics consisting of much highly controlled meso bond chains.

Of the requirements for the stereoregular polypropylene in the present invention, (d) a weight average molecular weight (Mw) and (e) a ratio (Mw/Mn) of a weight average molecular weight (Mw) to a number average molecular weight (Mn) are calculated from the results determined by a gel permeation chromatography (GPC) in the following manner. They were measured at 135° C. using an o-dichlorobenzene solution with 0.05% by weight of a polymer concentration and a mixed polystyrene gel column, e.g. PSK gel GMH6-HT available from Toso K. K. in Japan. As a measuring device, GPC-150C manufactured by Waters Co. Ltd. is used for instance.

The requirement for the stereoregular polypropylene, (d) a weight average molecular weight (Mw) is 50,000 to 1,000,000, preferably 100,000 to 1,000,000.

The requirement for the stereoregular polypropylene, (e) a ratio (Mw/Mn) of the weight average molecular weight (Mw) to a number average molecular weight (Mn) is 1.5 to 3.8, preferably 1.5 to 3.5.

The ratio (Mw/Mn) of the weight average molecular weight (Mw) to a number average molecular weight (Mn) is a measure of a molecular weight distribution. Larger ratio (Mw/Mn) means wider molecular weight distribution, whereas smaller ratio means narrower molecular weight distribution.

The essential requirements for the stereoregualr polypropylene in the present invention are five as mentioned above, but a melting point of said polypropylene shows 155° to 168° C. due to these structural feature, in particular, the above requirements (a) to (c), 160° to 168° C., and further 162° to 168° C. depending on the structural condition.

The melting point as referred to herein is a temperature showing a peak on melting which was determined by heating polypropylene from room temperature to 230° C. at a rate of 30° C./min, keeping it at the same temperature for 10 minutes, followed by cooling down to −20° C. at a rate of −20° C./min, keeping it at the same temperature for 10 minutes and heating again it at a rate of 20° C./min, using a DSC 7 type differential scanning calorimeter manufactured by Perkin Elmer Co.

The α-olefin copolymer which is an essential component for the polypropylene composition of the present invention should contain 10 to 90% by weight, preferably 20 to 90% by weight of an α-olefin and 90 to 10% by weight, preferably 80 to 10% by weight of at least one of other α-olefins, for obtaining molded products having excellent impact resistance.

α-Olefin copolymers wherein an α-olefin is random-copolymerized with other α-olefin are preferable for obtaining molded products having better impact resistance. The copolymers can be used in either non-crystalline or crystalline form.

α-Olefins contained in the α-olefin copolymer can include α-olefins of 2–12 carbons, preferably ethylene, propylene, 1-butene, 4-methyl-1-pentene, 1-pentene, 1-hexene, 1-octene, especially preferably ethylene and propylene. As the copolymers can be used those wherein two, three or more α-olefins are copolymerized. Further, the copolymers wherein α-olefins are copolymerized with less than 10% by weight of polyenes can also be used.

Examples of the α-olefin copolymers used in the composition of the present invention can include ethylene/propylene random copolymer, ethylene/1-butene random copolymer, ethylene/1-hexene random copolymer, ethylene/1-octene random copolymer, ethylene/1-butene/1-hexene random copolymer, ethylene/1-butene/1-octene random copolymer, ethylene/propylene/1-butene random copolymer and propylene/1-butene random copolymer. The combination of two or more copolymers as mentioned above can be used. Further, α-olefin/polyene random copolymers, e.g., propylene/polyene random copolymer, ethylene/propylene/polyene random copolymer can be used.

The polypropylene composition of the present invention comprises 20 to 95% by weight, preferably 50 to 95% by weight, most preferably 80 to 95% by weight of a stereo-regular polypropylene and 5 to 80% by weight, preferably 5 to 50% by weight, most preferably 5 to 20% by weight of an α-olefin copolymer. If the stereoregular polypropylene and the α-olefin copolymer fall within the above ranges, the resultant polypropylene composition can provide the molded products with good balance of rigidity and impact resistance, high heat resistance and high toughness, thus achieving the objects of the present invention.

The polypropylene composition of the present invention demonstrates excellent balance of rigidity and impact resistance with a flexural modulus of at least 950 MPa and an Izot impact strength of at least 115 J/m$^2$, and further has a high quality with a deflection temperature of at least 105° C. and a toughness of at least 12.0 MPa.

The processes of producing the present polypropylene composition are not limited to specific one. Typical processes can include (I) a process wherein the stereoregular polypropylene and α-olefin copolymer are individually prepared and thereafter both components are mixed using a conventional mixing apparatus and (II) a process of directly preparing the polypropylene composition using a multistage polymerization procedure by which propylene is polymerized in the presence of a catalyst and subsequently α-olefin is copolymerized under the condition that polypropylene and the catalyst have been mixed. Processes (I) and (II) will be explained below. (I) Process wherein the stereoregular polypropylene and α-olefin copolymer are individually prepared and thereafter both components are mixed using a conventional mixing apparatus Regarding the processes of preparing the stereoregular polypropylene used in the present invention, any process can be employed if the resultant polypropylene satisfies the above-mentioned requirements. At the present time, the process using a metallocene catalyst can be employed, which will be mentioned below.

The metallocene catalysts used in this process include a catalyst comprising (A) a transition metal compound having at least one π-electron conjugated ligand and (B) at least one compound selected from an aluminoxane, an ionic compound which reacts with said transition metal compound to form an ionic complex and Lewis acid, and a catalyst comprising the compound (A), the compound (B) and (C) an organic aluminum compound.

The compound (A) is generally called "metallocene", which is a transition metal complex wherein a π-electron conjugated ligand, i.e. a η-cyclopentadienyl structure, η-benzene structure, η-cyclohepta-trienyl structure or η-cyclooctatetraene structure is at least one coordinated in a transition metal.

Any metallocene can be used in the present invention, if the isotactic polypropylene having the above-mentioned requirements is prepared. Preferred metallocene is a chiral transition metal compound represented by the formula of $Q(C_5H_{4-m}R^1_m)(C_5H_{4-n}R^2_n)MXY$ wherein $(C_5H_{4-m}R^1_m)$ and $(C_5H_{4-n}R^2_n)$ represent a substituted cyclopentadienyl group; m and n are an integer of 1 to 3; R$^1$ and R$^2$ may be the same or different and each represents a hydrocarbyl radical of 1 to 20 carbons, a silicon-containing hydrocarbyl radical or a hydrocarbyl radical which is joined with two carbon atoms on the cyclopentadienyl ring to form one or more hydrocarbon rings which may be substituted by a hydrocarbon; Q is a group capable of crosslinking $(C_5H_{4-m}R^1_m)$ and $(C_5H_{4-n}R^2_n)$ and represents a divalent, hydrocarbyl radical, an unsubstituted silylene group or a hydrocarbyl-substituted silylene group; M represents titanium, zirconium or hafnium; X and Y may be the same or different and each represents a hydrogen, a halogen or a hydrocarbyl radical.

More preferred metallocene is the chiral transition metal compound of the above formula wherein R$^1$ and R$^2$ may be the same or different and each represents an alkyl group of 1 to 20 carbons; Q is an dialkylsilylene group; M represents zirconium or hafnium; and X and Y may be the same or different and each represents a halogen or a hydrocarbyl radical.

Examples of such metallocenes include:
Dimethylsilylene(3-t-butylcyclopentadienyl)(fluorenyl) zirconium dichloride,
Dimethylsilylene(3-t-butylcyclopentadienyl)(fluorenyl) hafnium dichloride,
rac-Ethylene bis(indenyl)zirconium dimethyl,
rac-Ethylene bis(indenyl)zirconium dichloride,
rac-Dimethylsilylene bis(indenyl)zirconium dimethyl,
rac-Dimethylsilylene bis(indenyl)zirconium dichloride,
rac-Ethylene bis(tetrahydroindenyl)zirconium dimethyl,
rac-Ethylene bis(tetrahydroindenyl)zirconium dichloride,
rac-Dimethylsilylene bis(tetrahydroindenyl)zirconium dimethyl,
rac-Dimethylsilylene bis(tetrahydroindenyl)zirconium dichloride,
rac-Dimethylsilylene bis(2-methyl-4,5,6,7-tetrahydroindenyl) zirconium dichloride,
rac-Dimethylsilylene bis(2-methyl-4,5,6,7-tetrahydroindenyl)zirconium dimethyl,
rac-Ethylene bis(2-methyl-4,5,6,7-tetrahydroindenyl) hafnium dichloride,
rac-Dimethylsilylene bis(2-methyl-4-phenylindenyl) zirconium dichloride,
rac-Dimethylsilylene bis(2-methyl-4-phenylindenyl) zirconium dimethyl,
rac-Dimethylsilylene bis(2-methyl-4-phenylindenyl) hafnium dichloride,
rac-Dimethylsilylene bis(2-methyl-4-naphthylindenyl) zirconium dichloride,
rac-Dimethylsilylene bis(2-methyl-4-naphthylindenyl) zirconium dimethyl,
rac-Dimethylsilylene bis(2-methyl-4-naphthylindenyl) hafnium dichloride,
rac-Dimethylsilylene bis(2-methyl-4,5-benzoindenyl) zirconium dichloride,
rac-Dimethylsilylene bis(2-methyl-4,5-benzoindenyl) zirconium dimethyl,
rac-Dimethylsilylene bis(2-methyl-4,5-benzoindenyl) hafnium dichloride,
rac-Dimethylsilylene bis(2-ethyl-4-phenylindenyl) zirconium dichloride,
rac-Dimethylsilylene bis(2-ethyl-4-phenylindenyl) zirconium dimethyl,
rac-Dimethylsilylene bis(2-ethyl-4-phenylindenyl)hafnium dichloride,
rac-Dimethylsilylene bis(2-methyl-4,6-diisopropylindenyl) zirconium dichloride,
rac-Dimethylsilylene bis(2-methyl-4,6-diisopropylindenyl) zirconium dimethyl,
rac-Dimethylsilylene bis(2-methyl-4,6-diisopropylindenyl) hafnium dichloride,
Dimethylsilylene(2,4-dimethylcyclopentadienyl)(3',5'-dimethylcyclopentadienyl)titanium dichloride,
Dimethylsilylene(2,4-dimethylcyclopentadienyl)(3',5'-dimethylcyclopentadienyl)titanium dichloride,
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dimethyl,
Dimethylsilylene(2,4-dimethylcyclopentadienyl)(3',5'-dimethylcyclopentadienyl)hafnium dichloride,
Dimethylsilylene(2,4-dimethylcyclopentadienyl)(3',5'-dimethylcyclopentadienyl)hafnium dimethyl,
Dimethylsilylene(2,3,5-trimethylcyclopentadienyl)(2',4',5'-trimethylcyclopentadienyl)titanium dichloride, Dimethylsilylene(2,3,5-trimethylcyclopentadienyl)(2',4',5'-trimethylcyclopentadienyl)zirconium dichloride,
Dimethylsilylene(2,3,5-trimethylcyclopentadienyl)(2',4',5'-trimethylcyclopentadienyl)zirconium dimethyl,
Dimethylsilylene(2,3,5-trimethylcyclopentadienyl)(2',4',5'-trimethylcyclopentadienyl)hafnium dichloride, and
Dimethylsilylene(2,3,5-trimethylcyclopentadienyl)(2',4',5'-trimethylcyclopentadienyl)hafnium dimethyl.

Of these metallocenes, especially preferred are the following compounds:
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dimethyl,
Dimethylsilylene(2,4-dimethylcyclopentadienyl)(3',5'-dimethylcyclopentadienyl)hafnium dichloride,
Dimethylsilylene(2,3,5-trimethylcyclopentadienyl)(2',4',5'-trimethylcyclopentadienyl)zirconium dichloride,
Dimethylsilylene(2,3,5-trimethylcyclopentadienyl)(2',4',5'-trimethylcyclopentadienyl)zirconium dimethyl,
Dimethylsilylene(2,3,5-trimethylcyclopentadienyl)(2',4',5'-trimethylcyclopentadienyl)hafnium dichloride, and
Dimethylsilylene(2,3,5-trimethylcyclopentadienyl)(2',4',5'-trimethylcyclopentadienyl)hafnium dimethyl.

In the synthesis of these chiral metallocenes, a metallocene of meso form in a non-chiral structure may be formed as a by-product. In the practical use, however, all are not required to be chiral metallocenes and the meso form may be mixed. When a mixture with the meso form is used, there may be the case where atactic polypropylene polymerized from the meso form is required to remove by known process such as solvent extraction or the like so that the resulting polypropylene may meet the above essential requirements depending on the proportion of the meso form mixed and the polymerization activity of propylene.

The transition metal compound (A) can be combined with Compound (B), or Compounds (B) and (C) to form a catalyst, but it can be supported on a finely divided carrier. The carrier is an inorganic or organic compound. The finely divided solid in a granular or spherical form having a particle diameter of 5 to 300 μm, preferably 10 to 200 μm is used.

The inorganic compounds used for the carrier include $SiO_2$, $Al_2O_3$, MgO, $TiO_2$, ZnO or the mixtures thereof, e.g. $SiO_2$—$Al_2O_3$, $SiO_2$—MgO, $SiO_2$—$TiO_2$, $SiO_2$—$Al_2O_3$—MgO. Of these compounds, those comprising $SiO_2$ or $Al_2O_3$ as a main component are preferred.

The organic compounds used for the carrier include polymers or copolymers of α-olefin of 2–12 carbons such as ethylene, propylene, 1-butene, 4-methyl-1-pentene, and polymers or copolymers of styrene or styrene derivatives.

Compound (B) used as a catalyst component in the production of the stereoregular polypropylene used in the composition of the present invention is at least one compound selected from an aluminoxane, an ionic compound which reacts with the transition metal compound (A) to form an ionic complex and Lewis acid.

The aluminoxane is an organoaluminum compound represented by the following formula (1) or (2)

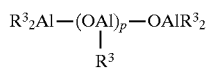 (1)

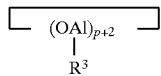 (2)

wherein $R^3$ represents a hydrocarbyl radical of 1 to 6 carbons, preferably 1 to 4 carbons, which includes an alkyl group such as methyl, ethyl, propyl, butyl, isobutyl, pentyl, hexyl; an alkenyl group such as allyl, 2-methylallyl, propenyl, isopropenyl, 2-methyl-1-propenyl, butenyl; a cycloalkyl group such as cyclopropyl, cyclobutyl, cyclopentyl, cyclohexyl; and an aryl group. Of these, the alkyl group is especially preferred and each $R^3$ may be identical or different. p is an integer of 4 to 30, preferably 6 to 30, most preferably 8 to 30.

The above-mentioned aluminoxanes can be prepared under various known conditions. More specifically, the following methods can be illustrated:

(i) a method of reacting a trialkyl aluminum directly with water in the presence of an organic solvent such as toluene, ether;
(ii) a method of reacting an trialkyl aluminum with salts containing water of crystallization such as copper sulfate hydrate, aluminum sulfate hydrate;
(iii) a method of reacting an trialkyl aluminum with water impregnated in silica gel or the like;
(iv) a method of reacting a mixture of trimethyl aluminum and tri-isobutyl aluminum directly with water in the presence of an organic solvent;
(v) a method of reacting a mixture of trimethyl aluminum and tri-isobutyl aluminum with salts containing water of crystallization such as copper sulfate hydrate, aluminum sulfate hydrate; and
(vi) a method of reacting tri-isobutyl aluminum with water impregnated in silica gel, followed by reacting with trimethyl aluminum.

The ionic compounds which react with the transition metal compound (A) to form an ionic complex and Lewis acids can include those disclosed in Japanese Patent Kokai (Toku Hyou) Hei 1-501950 and Hei 1-502036, Japanese Patent Kokai Hei 3-179005, Hei 3-179006, Hei 3-207703 and Hei 3-207704.

The ionic compounds usable in the present invention are salts of a cationic compound and an anionic compound. An anion reacts with the transition metal compound (A) to make the transition metal compound cationic and to form an ion pair so as to stabilize the transition metal cation species. Examples of such anions include those of organoboron compounds, organoaluminum compounds or the like. Examples of cations include metallic cation, organometallic cation, carbonium cation, tripium cation, oxonium cation, sulfonium cation, phosphonium cation and ammonium cation.

Of these, preferred are ionic compounds containing a boron atom as an anion, examples of which can include triethylammonium tetraxis(pentafluorophenyl)borate, tri-n-butylammonium tetraxis(pentafluorophenyl)borate, triphenylammonium tetraxis(pentafluorophenyl)borate, methylanilinium tetraxis(pentafluorophenyl)borate, dimethylanilinium tetraxis(pentafluorophenyl)borate, trimethylanilinium tetraxis(pentafluorophenyl)borate and the like.

As Lewis acids, a boron atom-containing Lewis acid is preferable. Usable are the compounds represented by the following formula:

wherein $R^4$, $R^5$ and $R^6$ represent each independently a fluorine atom, an alkyl group or a phenyl group which may be substituted by fluorine, methyl or trifluoromethyl.

Examples of the compounds represented by the above formula include trifluoroboron, tri(n-butyl)boron, triphenylboron, tris[3,5-bis(trifluoromethyl)phenyl]boron, tris[(4-fluoromethyl)phenyl]boron, tris(3,5-difluorophenyl)

boron, tris(2,4,6-trifluorophenyl)boron, tris (pentafluorophenyl)boron and the like. Of these, tris (pentafluorophenyl)boron is particularly preferred.

When aluminoxanes are used as Compound (B), the proportion of the transition metal compound (A) and Compound (B) used is in such a range that the aluminum atom in the aluminoxane is in the range of 1–50,000 mol, preferably 10–30,000 mol, most preferably 50–20,000 mol per mol of the transition metal atom in the transition metal compound (A).

When the ionic compounds or Lewis acids are used as Compound (B), they are used in the range of 0.01–2,000 mol, preferably 0.1–500 mol per mol of the transition metal atom in the transition compound (A).

At least one of the above Compounds (B) can be used.

The organoaluminum compounds (C) used as one component of the catalyst for the polymerization involved in the present invention include the compounds represented by the following formula:

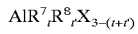

wherein $R^7$ and $R^8$ represent a hydrocarbyl radical such as an alkyl group of 1–10 carbons, a cycloalkyl group, an aryl group, or an alkoxy group, X represents a halogen atom, and t and t' represent any number of $0<t+t'\leq3$.

Examples of the compounds represented by the above formula include trialkylaluminums such as trimethylaluminum, triethylaluminum, triisopropylaluminum, triisobutylaluminum, tri-n-butylaluminum; dialkylaluminum halides such as dimethylaluminum chloride, dimethylaluminum bromide, diethylaluminum chloride, diisopropylaluminum chloride; and alkylaluminum sesquihalides such as methylaluminum sesquichloride, ethylaluminum sesquichloride, ethylaluminum sesquibromide, isopropylaluminum sesquichloride. At least one of the above compounds can be used.

The proportion of the organoaluminum compound used is in such a range that the Al atom in the organoaluminum compound is in the range of 0–10,000 mol, preferably 0–5,000 mol, most preferably 0–3,000 mol per mol of the transition metal atom in the transition metal compound (A).

The stereoregular polypropylene used in the composition of the present invention is prepared by the polymerization of propylene using a specific catalyst consisting of a combination of Compound (A) and Compound (B) or a combination of Compound (A), Compound (B) and Compound (C).

As the processes for the polymerization of propylene can be used known polymerization processes of propylene, which include a slurry polymerization wherein propylene is polymerized in an inert solvent including an aliphatic hydrocarbon such as butane, pentane, hexane, heptane, isooctane; an alicyclic hydrocarbon such as cyclopentane, cyclohexane, methylcyclohexane; an aromatic hydrocarbon such as toluene, xylene, ethylbenzene; and gasoline fraction and hydrogenated diesel oil; a bulk polymerization wherein propylene itself is used as a solvent; and a gas phase polymerization wherein propylene is polymerized in a gas phase.

In the polymerization of propylene, the above-mentioned catalyst may be fed to a polymerization reaction system in the form of a mixture obtained by previously mixing Compounds (A) and (B) or Compounds (A), (B) and (C) in an inert solvent. Alternatively, Compounds (A) and (B) or Compounds (A), (B) and (C) may be separately fed to the polymerization reaction system. Prior to the polymerization of propylene, the catalyst consisting of a combination of Compounds (A) and (B), or Compounds (A), (B) and (C) may be pre-activated by the polymerization reaction of said catalyst with small amounts of α-olefins, more specifically about 1 g to about 10 kg of α-olefins per mol of the transition metal in Compound (A), and subsequently the polymerization of propylene can be carried out. This procedure is effective in obtaining a final polypropylene in good particular form, which is included within the scope of the present invention.

As α-olefins which are usable in the pre-activation of the catalysts, there are preferably used those of 2 to 12 carbons, examples of which include ethylene, propylene, butene, pentene, hexene, octene, 4-methyl-1-pentene or the like. In particular, ethylene, propylene and 4-methyl-1-pentene are preferably used.

The thus prepared catalysts or the pre-activated catalysts are used in the polymerization of propylene according to the polymerization processes as mentioned above. As the polymerization conditions can be employed similar conditions to those in the polymerization of propylene according to known conventional Ziegler catalysts. More specifically, the polymerization of propylene is performed at the polymerization temperature ranging from –50° to 150° C., preferably –10° to 100° C. and the polymerization pressure ranging from an atmospheric pressure to 7 Mpa, preferably 0.2 to 5 Mpa in the presence of hydrogen, usually for about one minute to about 20 hours. The suitable amount of hygrogen is 0.1 kPa to 5 Mpa, preferably 1 kPa to 3 Mpa in terms of a partial pressure of hydrogen at the gas phase portion in the polymerizer.

After completion of the polymerization of propylene, known after-treatments may be carried out, if necessary, including deactivation of the catalyst, removal of the catalyst residue, drying of the product or the like. The stereoregular polypropylenes used in the present invention are produced through such after-treatments, but must have five requirements as listed hereinabove. If such requirements are not satisfied, the object of the present invention cannot be achieved.

Thus, the polymerization of propylene using the above metallocene under the above-mentioned polymerization conditions cannot always produce the desired stereoregular polypropylenes of the present invention. Depending on the kind of metallocene, choice of an optimum polymerization condition is required. For the optimum condition, relatively lower polymerization temperature is often selected from the range of the polymerization condition as mentioned above.

The processes for the production of the α-olefin copolymers used in the present invention are not limited to specific one, and known copolymerization processes are employable. In a preferred embodiment of the present invention, there are used α-olefin copolymers prepared by the random copolymerization of α-olefin using similar catalysts and polymerization condition as in the production of the above-mentioned polypropylene used in the composition of the present invention.

The thus prepared polypropylene and α-olefin copolymer are mixed in the predetermined amount, and then sufficiently kneaded to prepare the polypropylene composition of the present invention. The mixing apparatus used in this proces can include a high speed mixing apparatus such as Henschel mixer, super mixer or the like. The kneading apparatus used in this process can include Banbury mixer, roll, Ko-kneader, a single- or twin-screw extruder or the like. The mixing conditions are not limited, but mixing can be carried out, for example, at a temperature ranging from room temperature to 100° C., preferably from room temperature to 60° C. for a time ranging from one minute to one hour, preferably from 3 minutes to 30 minutes. Further, the kneading conditions are not limited, but for example, as the residence time within the extruder can be used the range of from 10 seconds to 30 minutes, preferably 20 seconds to 20 minutes. The kneading temperature can include the range of 180° to 300° C., preferably 200° to 280° C.

II. Process of directly preparing the polypropylene composition using a multi-stage polymerization procedure by which propylene is polymerized in the presence of a catalyst and subsequently α-olefin is copolymerized under the condition that polypropylene and the catalyst have been mixed.

The catalysts illustrated in the above-mentioned process (I) and the preactivated catalysts are used in the first stage polymerization or copolymerization of propylene or propylene containing α-olefin in accordance with the polymerization process as mentioned above. As the polymerization conditions in the first stage polymerization or copolymerization can be usually employed similar conditions to those in the polymerization of propylene according to known conventional Ziegler catalysts. More specifically, the polymerization is performed at the temperature ranging from −50° to 150° C., preferably −10° to 100° C. and the pressure ranging from an atmospheric pressure to 7 Mpa, preferably 0.2 to 5 Mpa in the presence of hydrogen, usually for about one minute to about 20 hours. The suitable amount of hygrogen is 0.1 kPa to 5 Mpa, preferably 1 kPa to 3 Mpa in terms of a partial pressure of hydrogen at the gas phase portion in the polymerization reactor.

In the first stage polymerization or copolymerization as metnioned above, the polymerization conditions are required to be controlled so that the polypropylene satisfying all the above requirements (a) to (e) comprises 20 to 95% by weight of the polypropylene composition. This first stage polymerization or copolymerization can be carried out in a multi-stage.

Subsequent to the first stage polymerization or copolymerization, the second stage copolymerization of two or more α-olefins is carried out in one or more stages under similar conditions as in the first stage. The term "one stage" as used herein means a pause of continuous or temporary feed of the monomers.

In the second stage copolymerization, the copolymerization conditions are required to be controlled so that the α-olefin copolymer with the α-olefin content of 10 to 90% by weight comprises 5 to 80% by weight based on the total weight of the composition.

After completion of the second stage copolymerization, known treatments for the deactivation of catalyst, removal of catalyst residue, drying or the like may be carried out, if necessary, whereby the polypropylene composition of the present invention is prepared.

The thus prepared polypropylene composition of the present invention may be blended, if necessary, with various additives such as antioxidants, ultraviolet absorbing agents, antistatic agents, nucleating agents, lubricants, flame retardants, antiblocking agents, colorants, inorganic or oranic fillers or the like or further with various synthetic resins, and subsequently kneaded under heat-melt using a melt kneader, and further cut into a particulate pellet which can be served as a molding material.

The molding materials in the form of pellets can be subjected to known techniques for the molding of polypropylene such as injection molding, extrusion molding, foam molding, blow molding or the like, by which there can be produced various types of moldings such as industrial injection molded parts, various containers, unstretched or stretched films, biaxially oriented films, sheets, pipes, fibers and the like.

The invention is further illustrated by the following examples. The definitions of the terms and the measuring methods which are used in the Examples or Comparative Examples are mentioned below.

(1) Isotactic pentad (m m m m): It was determined in the above-mentioned manner.

(2) Syndiotactic pentad (r r r r): It was determined in the above-mentioned manner.

(3) Proportion of different bond: It was determined in the above-mentioned manner.

(4) Weight average molecular weight (Mw): It was determined in the above-mentioned manner.

(5) Number average molecular weight (Mn): It was determined in the above-mentioned manner.

(6) Melting point: It was determined in the above-mentioned manner. (Unit ° C.)

(7) Rigidity: The polypropylene composition was molded at a resin melting temperature of 230° C. and a mold temperature of 50° C. using an injection molding machine to form a JIS type test piece. The test piece was allowed to stand in a room at a relative humidity of 50% and a room temperature of 23° C. for 7 hours and then measured for a flexural modulus in accordance with JIS K7203. (Unit: MPa)

(8) Impact resistance: The test piece was prepared in a similar manner as in (7) above and measured for Izod impact strength in accordance with JIS K7210. (Unit: $J/m^2$)

(9) Heat resistance: The test piece was prepared in a manner similar to that in (7) above and measured for deflection temperature(HDT) under stress at 0.451 MPa in accordance with JIS K7203. This measured value was defined as a measure of heat resistance. Higher deflection temperature (HDT) indicates better heat resistance. (Unit: ° C.)

(10) Toughness: Considering that a strength of the material until reaching to the breakage subsequent to the yield point in one direction tesile test of the subject specimen expresses a toughness, the value of (a strength at break minus a strength at yield point) is defined as a measure of toughness. More specifically, the polypropylene pellets as prepared in a manner similar to that in (7) above were heat melted at 230° C. and 4.0 Mpa for 3 minutes and then cooled at 30° C. and 14.8 MPa for 3 minutes using a pressing machine, and a compression molded sheet of 0.5 mm thickness was removed from a mold, from which a test specimen of 50 mm (length)×6 mm (width) was blanked. The specimen was stretched at 40° C. in a longitudinal direction at a deformation rate of 10 mm/minute using a storograph manufactured by Toyo Seiki Co. Ltd. and a strength at yield point at that time was expressed as Sy (Unit: MPa). After the necking portion of the specimen for which the strength at yield point was measured was cut with scissors, a central portion of the specimen was stretched again at 40° C. in a longitudinal direction at a deformation rate of 10 mm/minute and a strength at break of the specimen was expressed as Sb (Unit: MPa).

The value of (Sb−Sy) was defined as a measure of toughness. Higher value shows higher toughness. (Unit: MPa)

EXAMPLE 1

(1) Production of stereoregular polypropylene

A 100 $dm^3$ stainless polymerization reactor equipped with an agitator having a tilted impeller was purged with nitrogen gas and charged at 20° C. with 50 $dm^3$ of n-hexane, 7.6 mol (in terms of Al atom) of a tolune solution of methyl aluminoxane (concentration: 2 mol/$dm^3$, available from Toso-Aczo Co. Ltd. under the trade name of MMAO) and a mixture of 1.48 mmol chiral dimethylsilylene(2,3,5-trimethylcyclopentadienyl)(2',4',5'-trimethylcyclopentadienyl)hafnium dichloride and 0.05 mmol meso dimethylsilylene-(2,3,5-trimethylcyclopentadienyl)(2',3',5'-trimethylcyclopentadienyl)hafnium dichloride together with 1 dm$^3$ of toluene. The internal temperature of the polymerization reactor was maintained at 30° C., hydrogen was supplied so that the hydrogen pressure at the gas phase portion within the reactor was 0.1 MPa and then propylene was supplied continuously to the reactor for 4 hours so that the internal pressure was maintained at 0.4 MPa, thereby carrying out the polymerization of propylene. During the polymerization, the internal temperature of the reactor was maintained at 30° C. After completion of the polymerization, unreacted propylene was discharged from the reactor, 3 dm$^3$ of 2-propanol was charged into the reactor and stirred at 30° C. for 10 minutes to carry out the deactivation of the catalyst. Subsequently, 0.2 dm$^3$ of an aqueous solution of hydrogen chloride (concentration: 12 mol/dm$^3$) and 8 dm$^3$ of methanol were added and the treatment was performed at 60° C. for 30 minutes. After the treatment stirring was ceased to remove an aqueous phase portion from the bottom of the reactor and the same amounts of an aqueous hydrogen chloride solution and methanol were added to repeat a similar operation. 0.02 dm$^3$ of an aqueous sodium hydroxide solution (concentration: 5 mol/dm$^3$), 2 dm$^3$ of water and 2 dm$^3$ of methanol were added and stirring was continuted at 30° C. for 10 minutes. After the treatment, stirring was ceased to remove an aqueous phase portion from the bottom of the reactor. 8 dm$^3$ of water was further added, stirring was continuted at 30° C. for 10 minutes and the operation to remove the aqueous phase portion was repeated twice. A polymer slurry was withdrawn from the reactor, filtered and dried to obtain 5.2 kg of polypropylene used in the present invention.

The resultant polypropylene was measured for the physical properties in the above manner, with the results shown in the following Table 1.

(2) Production of α-olefin copolymer (ethylene/propylene copolymer)

An α-olefin copolymer dissolved in toluene was produced by similar polymerization and purification procedures to those in (1) above, provided that 50 dm$^3$ of toluene was substituted for n-hexane, a mixed gas of 35 mol % propylene and 65 mol % ethylene was substituted for propylene, the mixed gas was continuously fed to the polymerization reactor at a rate of 8 dm$^3$/min, while keeping the internal temperature of the reactor at 50° C. and continuously discharging out of the reactor a portion of the mixed gas present at the gas phase portion within the reactor through a valve mounted to the reactor so that the pressure at the gas phase portion within the reactor was kept at 0.4 MPa, whereby a random copolymerization of ethylene and propylene was carried out. Subsequently, the contents in the reactor were elevated to 60° C. and 40 dm$^3$ of toluene was distilled off at reduced pressure. Further, the contents in the reactor were cooled down to 30° C. and 70 dm$^3$ of methanol was added to prepare 2.5 kg of non-crystalline etylene/propylene copolymer comprising 53.8% by weight of ethylene and 46.2% by weight of propylene. The copolymer was removed from the reactor and fractured into flakes.

(3) Production of polypropylene composition 4.6 kg of polypropylene prepared in (1) and 0.7 kg of the non-crystalline ethylene/propylene copolymer prepared in (2) were mixed with 5.3 g of tetraxis[methylene-3-(3',5'-di-tert.butyl-4'-hydroxyphenyl)propionate]methane and 5.3 g of calcium stearate. The mixture was formed into pellets using a single screw extruder and pelletizer set at a screw diameter of 40 mm and an extrusion temperature of 230° C. to obtain the polypropylene composition of the present invention in the form of pellets. The resultant composition was measured for the mechanical properties in the above manner, with the results shown in the following Table 1.

EXAMPLE 2

(1) Production of stereoregular polypropylene

A 100 dm$^3$ stainless polymerization reactor equipped with an agitator having a tilted impeller was purged with nitrogen gas and charged at 20° C. with 0.5 mol (in terms of Al atom) of a tolune solution of methylaluminoxane (concentration: 2 mol/dm$^3$, available from Toso-Aczo Co. Ltd. under the trade name of MMAO) and hydrogen so that the hydrogen pressure was maintained at 0.06 MPa, followed by introduction of 30 kg of liquefied propylene. A mixture of 0.033 mmol chiral dimethylsilylene(2,3,5-trimethylcyclopentadienyl)(2',4',5'-trimethylcyclopentadienyl) zirconium dichloride and 0.002 mmol meso dimethylsilylene (2,3,5-trimethylcyclopentadienyl)(2',3',5'-trimethylcyclopentadienyl)zirconium dichloride, as a metallocene together with 0.1 dm$^3$ of toluene were pressurized at 20° C. under the pressure of nitrogen into the reactor, thereby initiating the polymerization of propylene. During the polymerization, the internal temperature of the reactor was maintained at 30° C. Four hours after initiation of the polymerization, 3 dm$^3$ of 2-propanol was pressurized into the reactor, an operation to cease the polymerization was conducted at 30° C. for 5 minutes to discharge unreacted propylene from the reactor out of the system. Subsequently, 50 dm$^3$ of n-hexane was placed into the reactor and a similar after-treatment as in Example 1 was performed to produce 6.6 kg of polypropylene used in the present invention.

The resultant polypropylene was measured for the physical properties in the above manner, with the results 20 shown in the following Table 1.

(2) Production of α-olefin copolymer(ethylene/propylene copolymer)

A non-crystalline ethylene/propylene copolymer was prepared in a manner similar to that in (2) of Example 1, but feeding a mixed gas of 40 mol % propylene and 60 mol % ethylene to the polymerization reactor.

(3) Production of polypropylene composition 4.25 kg of polypropylene prepared in (1) and 0.75 kg of the non-crystalline ethylene/propylene copolymer prepared in (2) were mixed with 5.0 g of tetraxis[methylene-3-(3',5'-di-tert.butyl-4'-hydroxyphenyl)propionate]methane and 5.0 g of calcium stearate. The mixture was formed into pellets using a single screw extruder and pelletizer set at a screw diameter of 40 mm and an extrusion temperature of 230° C. to obtain the polypropylene composition of the present invention in the form of pellets. The resultant composition was measured for the mechanical properties in the above manner, with the results shown in the following Table 1.

COMPARATIVE EXAMPLE 1

The polymerization of propylene was carried out in a manner similar to that in (1) of Example 1, but using as the metallocene chiral dimethylsilylene(2,4-dimethylcyclopentadienyl)(3',5'-dimethylcyclopentadienyl) zirconium dichloride and changing the polymerization temperature to 70° C., thus producing 6.6 kg of polypropylene.

The resultant polypropylene was measured for the physical properties in the above manner, with the results shown in the following Table 1.

The non-crystalline propylene/ethylene copolymer was prepared in a manner similar to that in (2) of Example 1.

An attempt to prepare the polypropylene composition in a manner similar to that in (3) of Example 1 failed, because the molecular weight of polypropylene was too low, the melt resin sagged from the outlet of extruder and pelletizer, so that the pellets could not be formed.

EXAMPLE 3

A 100 dm$^3$ stainless polymerization reactor equipped with an agitator having a tilted impeller was purged with nitrogen gas and charged at 20° C. with 50 dm$^3$ of n-hexane, 7.6 mol (in terms of Al atom) of a tolune solution of methyl aluminoxane (concentration: 2 mol/dm$^3$, available from Toso-Aczo Co. Ltd. under the trade name of MMAO) and a mixture of 1.48 mmol chiral dimethylsilylene(2,3,5-trimethylcyclopentadienyl)(2',4',5'-trimethylcyclopentadienyl)hafnium dichloride and 0.05 mmol mesodimethylsilylene(2,3,5-trimethylcyclopentadienyl)(2',3',5'-trimethylcyclopentadienyl)hafnium dichloride together with 1 dm$^3$ of toluene. The internal temperature of the polymerization reactor was maintained at 30° C., hydrogen was supplied so that the hydrogen pressure at the gas phase portion within the reactor was 0.1 MPa, and then propylene was continuously fed to the reactor for 4 hours so that the internal pressure was maintained at 0.4 MPa, thereby carrying out the polymerization at the first stage. During the polymerization, the internal temperature of the reactor was maintained at 30° C. After 4 hours were passed, unreacted propylene and hydrogen were discharged from the reactor, the internal temperature of the reactor was maintained at 50° C. and a mixed gas comprising 65 mol % propylene and 35 mol % ethylene was continuously fed to the reactor for 5 minutes, while keeping the internal pressure of the reactor at 0.8 MPa to carry out the copolymerization at the second stage. During the polymerization, the internal temperature of the reactor was maintained at 50° C. After completion of the copolymerization, 3 dm$^3$ of 2-propanol was charged into the reactor and stirred at 30° C. for 10 minutes to carry out the deactivation of the catalyst. Subsequently, 0.2 dm$^3$ of an aqueous solution of hydrogen chloride (concentration: 12 mol/dm$^3$) and 8 dm$^3$ of methanol were added and the treatment was performed at 60° C. for 30 minutes. After the treatment, stirring was ceased to remove an aqueous phase portion from the bottom of the reactor and the same amounts of an aqueous hydrogen chloride solution and methanol were added to repeat a similar operation. 0.02 dm$^3$ of an aqueous sodium hydroxide solution (concentration: 5 mol/dm$^3$), 2 dm$^3$ of water and 2 dm$^3$ of methanol were added and stirring was continuted at 30° C. for 10 minutes. After the treatment, stirring was ceased to remove an aqueous phase portion from the bottom of the reactor. 8 dm$^3$ of water was further added, stirring was continuted at 30° C. for 10 minutes and the operation to remove the aqueous phase portion was repeated twice. The internal temperature of the reactor was raised to 50° C. and hexane was distilled off at reduced pressure out of the reactor to prepare 6.0 kg of the present polypropylene composition comprising 86.7% by weight of polypropylene and 13.3% by weight of propylene/α-olefin copolymer.

The resultant polypropylene composition was measured for the mechanical properties in the above manner, with the results shown in the following Table 1.

TABLE 1

| | Example 1 | Example 2 | Comparative Example 1 | Example 3 |
|---|---|---|---|---|
| Stereoregular polypropylene | | | | |
| Isotactic pentad (m m m m) | 0.968 | 0.960 | 0.920 | 0.968 |
| Syndiotactic pentad (r r r r) | 0.001 | 0.002 | 0.001 | 0.001 |
| Proportion of different bond (mol %) | Not detected | 0.08 | 0.12 | Not detected |
| Weight average molecular weight (Mw × 10$^{-4}$) | 18.0 | 21.6 | 1.8 | 18.0 |
| Mw/Mn | 2.1 | 2.2 | 2.0 | 2.1 |
| Polypropylene Composition | | | | |
| Stereoregular polypropylene (wt. %) | 86.8 | 85 | 85 | 86.7 |
| α-Olefin copolymer | 13.2 | 15 | 15 | 13.3 |
| (Ethylene content) (wt. %) | (53.8) | (46.0) | (45.0) | (54.1) |
| Flexural modulus (MPa) | 1130 | 1020 | —* | 1100 |
| Izod impact resistance (J/m$^2$) | 122 | 157 | —* | 125 |
| Defletion temperature (HDT)(°C.) | 115 | 112 | —* | 115 |
| Tenacity (MPa) | 14.0 | 15.6 | —* | 14.0 |

*Not measurable due to an impossible preparation of the pellet composition.

COMPARATIVE EXAMPLE 2

The polymerization of propylene was carried out in a similar manner as in Example 3, provided that the catalyst (combination of metallocene and methylaluminoxane) used in Example 3 was replaced by the catalyst comprising 1.0 mmol (in terms of Ti) of a titanium catalyst component carried on magnesium chloride which was prepared by a similar method to that in Example 3 of Japanese Patent Kokai Sho 62-104812, 150 mmol of triethyl aluminum and 130 mmol of diisopropyldimethoxysilane as a third component of the catalyst, the hydrogen pressure before initiation of the polymerization was 0.04 Mpa, the polymerization pressure was 0.8 Mpa and the polymerization temperature was 70° C.

After the polymerization of propylene, the internal temperature of the polymerization reactor was cooled down to 30° C., unreacted hydrogen and propylene were discharged out of the reactor, and the reactor was purged with nitrogen two times. A portion of the polypropylene slurry was removed from the reactor, dried and determined for the physical properties. Subsequently, 1.4 liters of hydrogen was fed to the reactor in the state that the polypropylene slurry (containing the catalyst) was present in the reactor, the internal temperature of the reactor was raised to 60° C., ethylene gas and propylene gas were fed to the reactor at the rate of 0.56 kg/hr and 1.25 kg/hr, respectively to carry out a random copolymerization of ethylene/propylene for 2 hrs. After completion of the copolymerization, the internal temperature of the reactor was cooled down to 30° C. and unreacted hydrogen, ethylene and propylene were discharged out of the reactor. The slurry was removed from the reactor and centrifuged to separate into a major part of solvent and a block copolymer (containing small amounts of solvent). The copolymer was dried with nitrogen heated at 100° C. to obtain the powdered ethylene/propylene block copolymer.

The resultant copolymer was measured for the mechanical properties in the above manner, with the results shown in the following Table 2.

EXAMPLE 4

A 100 dm$^3$ stainless polymerization reactor equipped with an agitator having a tilted impeller was purged with nitrogen gas and charged at 20° C. with 11 mol (in terms of Al atom) of a tolune solution of methylaluminoxane (concentration: 2 mol/dm$^3$, available from Toso-Aczo Co. Ltd. under the trade name of MMAO) and hydrogen so that the hydrogen pressure within the reactor was 0.06 MPa. Subsequently, 30 kg of liquefied propylene was fed to the reactor, and 11 mol (in terms of Al atom) of a tolune solution of methyl aluminoxane (concentration: 2 mol/dm$^3$, available from Toso-Aczo Co. Ltd. under the trade name of MMAO) and as metallocene a mixture of 0.033 mmol chiral dimethylsilylene(2,3,5-trimethylcyclopentadienyl) (2',4',5'-trimethylcyclopentadienyl)zirconium dichloride and 0.002 mmol meso dimethylsilylene(2,3,5-trimethylcyclopentadienyl)(2',3',5'-trimethylcyclopentadienyl)zirconium dichloride together with 0.1 dm$^3$ of toluene were pressurized at 20° C. under the pressure of nitrogen into the polymerization reactor, whereby the polymerization of propylene was initiated. During the polymerization, the internal temperature of the polymerization reactor was maintained at 30° C.

After 4 hours were passed, the internal temperature of the reactor was cooled down to 30° C., unreacted propylene was discharged from the reactor, and 50 dm$^3$ of n-hexane was charged into the reactor. Subsequently, the internal temperature of the reactor was maintained at 40° C. and a mixed gas comprising 65 mol % propylene and 35 mol % ethylene was continuously fed to the reactor for 5 minutes, while keeping the internal pressure of the reactor at 0.6 MPa to carry out the copolymerization at the second stage. During the polymerization, the internal temperature of the reactor was maintained at 40° C. After completion of the copolymerization, similar treatment as in Example 3 was carried out to prepare the present polypropylene composition comprising 83.7% by weight of polypropylene and 16.3% by weight of propylene/α-olefin copolymer.

The resultant polypropylene composition was measured for the mechanical properties in the above manner, with the results shown in the following Table 2.

COMPARATIVE EXAMPLE 3

A propylene/α-olefin block copolymer was prepared in a manner similar to that in Example 4, but using as the metallocene chiral dimethylsilylene(2,4-dimethylcyclopentadienyl)(3',5'-dimethylcyclopentadienyl)zirconium dichloride and changing the polymerization temperature at the first stage to 70° C.

An attempt to prepare the pellets for measuring the mechanical properties of the resultant block copolymer failed, because the molecular weight of polypropylene component was too low, the melt resin sagged from the port of the extruder and pelletizer, so that the desired pellets could not be obtained.

COMPARATIVE EXAMPLE 4

An ethylene/propylene block copolymer was prepared in accordance with the process of Example 2 disclosed in Japanese Patent Kokai Hei 4-337308.

The resultant block copolymer was measured for the mechanical properties in the above manner, with the results shown in the following Table 2.

TABLE 2

|  | Comparative Example 2 | Example 4 | Comparative Example 3 | Comparative Example 4 |
| --- | --- | --- | --- | --- |
| Stereoregular polypropylene | | | | |
| isotactic pentad (m m m m) | 0.954 | 0.960 | 0.920 | 0.965 |
| Syndiotactic pentad (r r r r) | 0.006 | 0.002 | 0.001 | 0.002 |
| Proportion of different bond (mol %) | Not detected | 0.08 | 0.12 | 0.12 |
| Weight average molecular weight (Mw × 10$^{-4}$) | 19.1 | 21.6 | 1.8 | 13.2 |
| Mw/Mn | 5.5 | 2.2 | 2.0 | 2.1 |
| Polypropylene Composition | | | | |
| Stereoregular polypropylene (wt. %) | 86.8 | 83.7 | 97.0 | 75.0 |
| α-Olefin copolymer | 13.2 | 16.3 | 3.0 | 25.0 |
| (Ethylene content) (wt. %) | (52.5) | (47.1) | (46.0) | (32.8) |
| Flexural modulus (MPa) | 945 | 1010 | —* | 820 |
| Izod impact resistance (J/m$^2$) | 110 | 160 | —* | 160 |
| Defletion temperature (HDT)(°C.) | 105 | 112 | —* | 101 |
| Tenacity (MPa) | 11.0 | 15.9 | —* | 12.0 |

*Not measurable due to an impossible preparation of the pellet composition.

ADVANTAGE OF THE INVENTION

As is evident from the results shown in the above tables, the polypropylene composition of the present invention has good balance of rigidity and impact resistance, high heat resistance and high toughness, which permits an enlargement of the use limited by the prior polypropylenes.

What is claimed is:

1. A polypropylene composition comprising 20 to 95% by weight of a stereoregular polypropylene and 5 to 80% by weight of an α-olefin copolymer, wherein the polypropylene is characterized in that (a) an isotactic pentad (m m m m) is 0.940 to 0.995, (b) a syndiotactic pentad (r r r r) is 0 to 0.01, (c) a different bond due to 2,1- and 1,3-insertions of propylene monomer is 0 to 0.10 mol %, (d) a weight average molecular weight (Mw) is 50,000 to 1,000,000 and (e) a ratio (Mw/Mn) of the weight average molecular weight (Mw) to a number average molecular weight (Mn) is 1.5 to 3.8, (a) to (e) being determined from $^{13}$C NMR spectra, and the α-olefin copolymer comprises 10 to 90% by weight of an α-olefin and 10 to 90% by weight of at least one of other α-olefins.

2. The polypropylene composition of claim 1 wherein the polypropylene is characterized in that the isotactic pentad (m m m m) is 0.960 to 0.995, the syndiotactic pentad (r r r r) is 0 to 0.004 and the different bond due to 2,1- and 1,3-insertions of propylene monomer is 0 to 0.08 mol %.

3. The polypropylene composition of claim 1 wherein the polypropylene has a melting point of 155° to 168° C.

4. The polypropylene composition of claim 1 wherein the polypropylene is prepared by the polymerization of propylene using a catalyst comprising (A) a transition metal compound having at least one π-electron conjugated ligand and (B) at least one compound selected from aluminoxane, an ionic compound which reacts with said transition metal compound to form an ionic complex and Lewis acid, or a catalyst comprising the compound (A), the compound (B) and (C) an organic aluminum compound.

5. The polypropylene composition of claim 4 wherein the compound (A) is a chiral transition metal compound represented by the formula of $Q(C_5H_{4-m}R^1_m)(C_5H_{4-n}R^2_n)MXY$ wherein $(C_5H_{4-m}R^1_m)$ and $(C_5H_{4-n}R^2_n)$ represent a substituted cyclopentadienyl group; m and n are an integer of 1 to 3; $R^1$ and $R^2$ may be the same or different and each represents a hydrocarbyl radical of 1 to 20 carbons, a silicon-containing hydrocarbyl radical or a hydrocarbyl radical which is joined with two carbon atoms on the cyclopentadienyl rings to form one or more hydrocarbon ring which may be substituted by a hydrocarbon; Q is a group capable of crosslinking $(C_5H_{4-m}R^1_m)$ and $(C_5H_{4-n}R^2_n)$ and represents a divalent, hydrocarbyl radical, an unsubstituted silylene group or a hydrocarbyl-substituted silylene group; M represents titanium, zirconium or hafnium; X and Y may be the same or different and each represents a hydrogen, a halogen or a hydrocarbyl radical.

6. The polypropylene composition of claim 5 wherein $R^1$ and $R^2$ may be the same or different and each represents an alkyl group of 1 to 20 carbons; Q is a dialkylsilylene group; M represents zirconium or hafnium; and X and Y may be the same or different and each represents a halogen or a hydrocarbyl radical.

7. The polypropylene composition of claim 6 wherein the chiral transition metal compound is selected from
dimethylsilylene(2,3,5-trimethylcyclopentadienyl)(2',3', 5'-trimethylcyclopentadienyl)zirconium dichloride,
dimethylsilylene(2,3,5-trimethylcyclopentadienyl)(2',3', 5'-trimethylcyclopentadienyl)hafnium dichloride or the mixture thereof.

8. The polypropylene composition of claim 1 wherein the α-olefin copolymer is ethylene/propylene random copolymer, ethylene/1-butene random copolymer, ethylene/1-hexene random copolymer, ethylene/1-octene random copolymer, ethylene/1-butene/1-hexene random copolymer, ethylene/1-butene/1-octene random copolymer, ethylene/propylene/1-butene random copolymer, propylene/1-butene random copolymer and α-olefin/polyene random copolymer.

9. The polypropylene composition of claim 1 wherein the α-olefin copolymer is prepared by the copolymerization of two or more α-olefins using a catalyst comprising (A) a transition metal compound having at least one π-electron conjugated ligand and (B) at least one compound selected from aluminoxane, an ionic compound which reacts with said transition metal compound to form an ionic complex and Lewis acid, or a catalyst comprising the compound (A), the compound (B) and (C) an organic aluminum compound.

10. The polypropylene composition of claim 9 wherein the compound (A) is a chiral transition metal compound represented by the formula of $Q(C_5H_{4-m}R^1_m)(C_5H_{4-n}R^2_n)MXY$ wherein $(C_5H_{4-m}R^1_m)$ and $(C_5H_{4-n}R^2_n)$ represent a substituted cyclopentadienyl group; m and n are an integer of 1 to 3; $R^1$ and $R^2$ may be the same or different and each represents a hydrocarbyl radical of 1 to 20 carbons, a silicon-containing hydrocarbyl radical or a hydrocarbyl radical which is joined with two carbon atoms on the cyclopentadienyl ring to form one or more hydrocarbon rings which may be substituted by a hydrocarbon; Q is a group capable of crosslinking $(C_5H_{4-m}R^1_m)$ and $(C_5H_{4-n}R^2_n)$ and represents a divalent, hydrocarbyl radical, an unsubstituted silylene group or a hydrocarbyl-substituted silylene group; M represents titanium, zirconium or hafnium; X and Y may be the same or different and each represents a hydrogen, a halogen or a hydrocarbyl radical.

11. The polypropylene composition of claim 10 wherein $R^1$ and $R^2$ may be the same or different and each represents an alkyl group of 1 to 20 carbons; Q is a dialkylsilylene group; M represents zirconium or hafnium; and X and Y may be the same or different and each represents a halogen or a hydrocarbyl radical.

12. The polypropylene composition of claim 11 wherein the chiral transition metal compound is selected from
dimethylsilylene(2,3,5-trimethylcyclopentadienyl)(2',3', 5'-trimethylcyclopentadienyl)zirconium dichloride,
dimethylsilylene(2,3,5-trimethylcyclopentadienyl)(2',3', 5'-trimethylcyclopentadienyl)hafnium dichloride or the mixture thereof.

13. A molded product formed from the polypropylene composition of claim 1.

* * * * *